Figure 1:
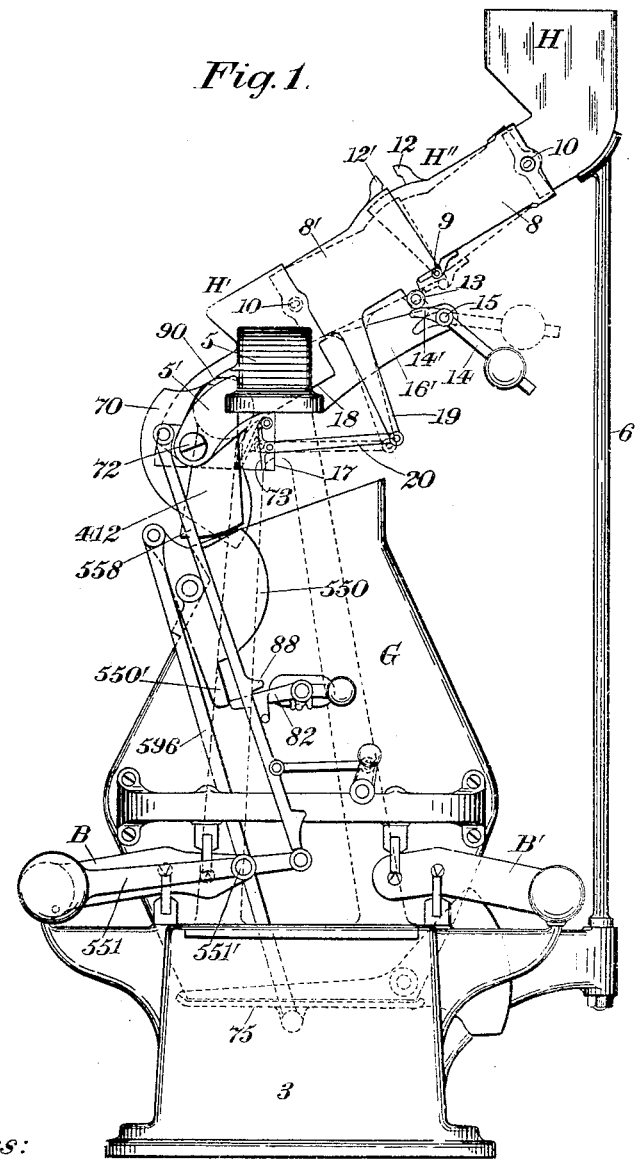

(No Model.)  2 Sheets—Sheet 1.
F. H. RICHARDS.
SUPPLY APPARATUS FOR WEIGHING MACHINES.

No. 570,300. Patented Oct. 27, 1896.

Witnesses:
J. L. Edwards Jr.
Fred. J. Dole.

Inventor:
F. H. Richards.

(No Model.) 2 Sheets—Sheet 2.
F. H. RICHARDS.
SUPPLY APPARATUS FOR WEIGHING MACHINES.
No. 570,300. Patented Oct. 27, 1896.
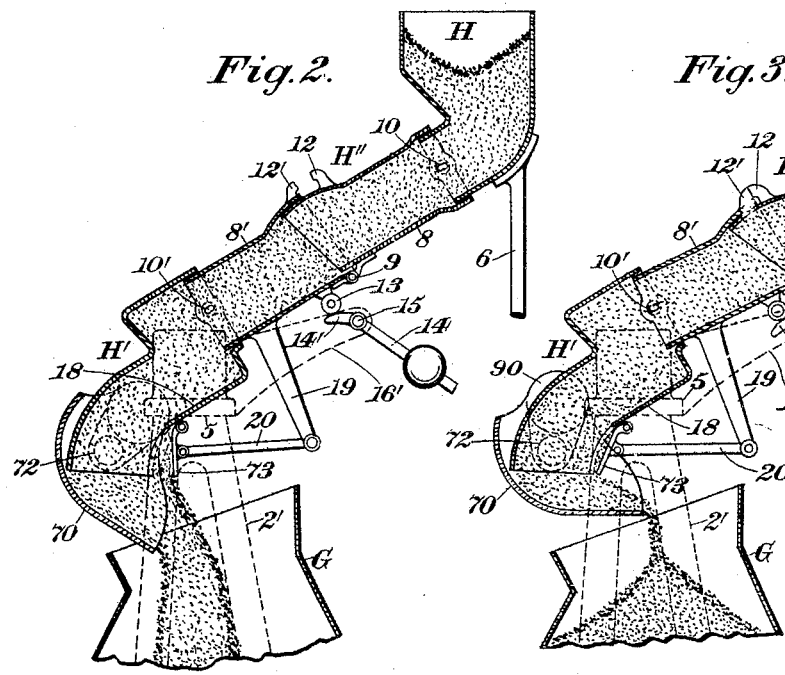
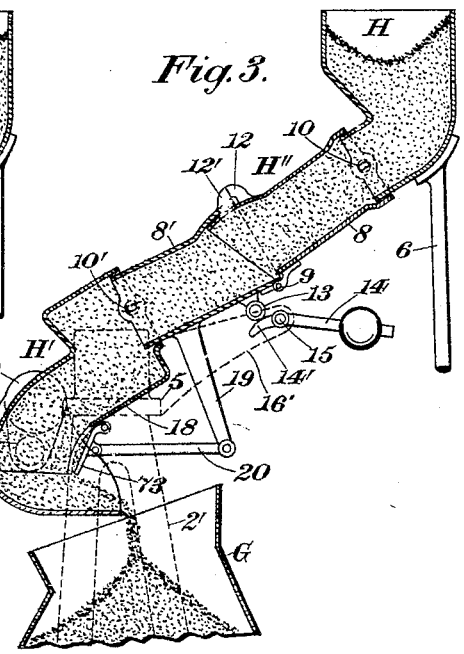
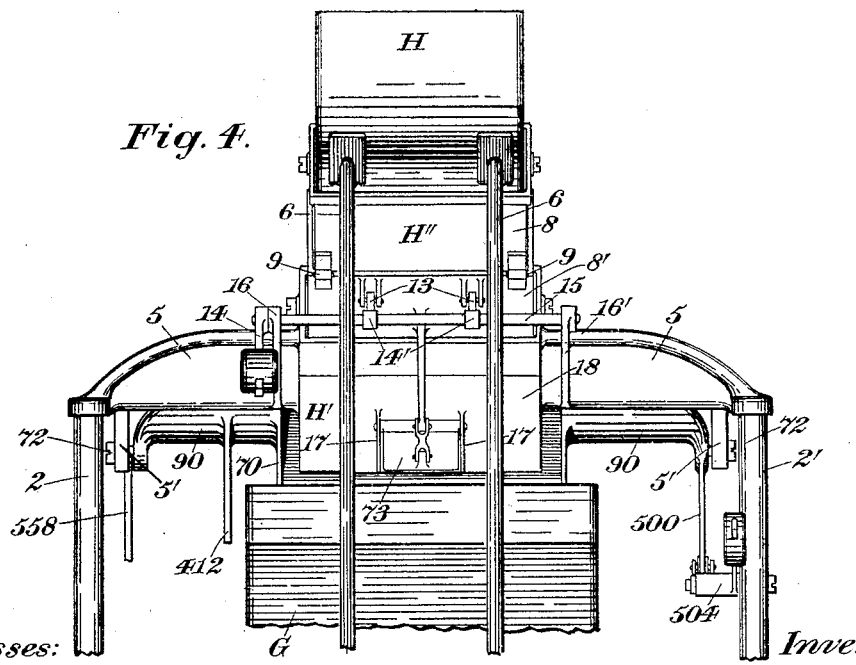
Witnesses:
J. L. Edwards Jr.
Fred. J. Dole.
Inventor
F. H. Richards

UNITED STATES PATENT OFFICE.

FRANCIS H. RICHARDS, OF HARTFORD, CONNECTICUT.

SUPPLY APPARATUS FOR WEIGHING-MACHINES.

SPECIFICATION forming part of Letters Patent No. 570,300, dated October 27, 1896.

Application filed July 1, 1896. Serial No. 597,679. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Supply Apparatus for Weighing-Machines, of which the following is a specification.

This invention relates to stream-controlling mechanism especially adapted for use in connection with automatic weighing-machines; and it has for its main object to provide means for regulating the flow of a stream of material carried by a chute or supply-conduit in accordance with variations in the force of the stream passing through the same.

In delivering some kinds of relatively free-flowing materials—such, for example, as wheat and oats—from bins to automatic weighing-machines it is frequently found that the specific gravity of the material varies, and that in flowing through the valve or valves of the weighing-machine—if these have been set so as to reduce the size of the stream by a fixed amount at each operation of filling the bucket or load-receiver of the weighing mechanism—the precision of the weighing operation will be affected, owing to the fact that while the bulk of material discharged through the drip-opening during the stream-reducing period will always be substantially the same, the weight of this reduced or drip stream will vary, and hence cause a corresponding variation in the weight of the load.

It is therefore one of the main objects of this invention to provide means for automatically regulating the size of the drip-opening, and hence of the drip-stream, during the reducing period, and for this purpose I employ suitable stream-controlling means—such as a valve—operative by a stream-chute, through which the flowing material passes, and which will have opposite stream-controlling movements as the force or specific gravity of the material passing therethrough increases and decreases. I prefer to employ a stream-chute in which variations in the specific gravity of the material will operate to cause a corresponding ascent or descent of the stream-chute, due to gravitational and reactive movements of such stream-supporting means.

In the drawings accompanying and forming part of this application, Figure 1 is an end elevation of an automatic weighing-machine having stream-controlling means embodying my present improvements. Fig. 2 is a vertical section of the upper portion of the same, showing the positions of the parts when material of low specific gravity is passing through the stream-chute. Fig. 3 is a corresponding view showing the positions of said parts under the influence of a stream of high specific gravity, and Fig. 4 is a front elevation of the upper portions of the weighing-machine shown in Fig. 1.

Similar characters designate like parts in all the figures of the drawings.

Any suitable framework may be employed for carrying the several operative parts of my improved stream-controlling means and a weighing-machine adapted for operation in connection therewith. In the present case this framework is shown comprising a supporting-base 3, for carrying the bucket and beam mechanisms of the weighing apparatus, a pair of side frames 2 and 2', supported thereon and connected at their upper ends by means of a top plate or beam 5, and supporting-rods—such as 6—carried at the front of the machine and rising from the base thereof, upon which supports the main stream-supplying means or hopper H is represented as fixed, while a corresponding fixed supply-chute is illustrated at H' secured to the top plate 5.

The stream-chute which I prefer to employ is shown at H" as a duplex tubular chute made up of a supply-section 8 and a delivery-section 8', pivoted, respectively, to the discharge end of the chute H and to the receiving end of the chute H' in such a manner that none of the material can flow out at the joints of the parts, these sections being represented connected by means of a hinge 9 and having the discharge end of the tubular section 8 within the receiving end of the section 8', said ends of the members 8 and 8' being suitably flared to form an elbow connection and permit oscillation of the parts of the stream-chute relatively to each other and to the pivots 10 and 10', at which they are joined to the fixed chute. Suitable stops are also illustrated at 12 and 12' for limiting the descent of the tubes 8 and 8', which form the stream-chute in this instance.

On the under side thereof the section 8' is illustrated herein carrying a pair of antifriction-rolls 13, adapted to engage the faces of cams 14', secured to a rock-shaft 15, mounted for oscillation in a pair of forwardly-extending arms 16 and 16', which are shown herein formed integral with the top plate 5.

A rock-arm is illustrated at 14 secured also to the rock-shaft 15 for the purpose of normally supporting the stream-chute in a determined position to control the action exerted by the cams 14' against the antifriction-rolls 13, secured to the section 8'.

Any suitable form of valve may be employed for controlling the flow of the stream from the delivery end of the chute H'. In the present case a main valve substantially similar to that described in my Patent No. 535,727, granted March 12, 1895, is shown at 70 supported for oscillation between the depending arms 5', carried by the top plate 5, this valve also having preferably a balance-weight 90 above the axis of movement thereof, which axis is designated herein by 72. It will be obvious that this valve will be operative for controlling the main supply-stream in a well-known manner and substantially as described in my patent hereinbefore referred to. For the purpose, however, of regulating the drip during the reducing period, when the last part of the load is being made up in the bucket, (designated herein in a general way by G,) I prefer to employ a supplemental valve in the form of a drip-regulator—such as 73—this valve being shown as a plate of sufficient size to just fill the opening in the lower edge of the front wall of the chute H and as pivoted at its upper end in extensions 17 from the forward wall of said chute, so that said regulator may swing back and forth in the opening in the fixed wall 18.

It will be apparent that the position of the regulator-plate will determine the size of the drip-opening in the chute H', and that by means of suitable connections between said plate and the stream-chute the movements of said stream-chute may be imparted to the regulator-plate to control the position of said regulator. For this purpose the stream-chute is illustrated herein carrying a rock-arm 19, having a pivotal connection with a link 20, pivoted to the forward side of the regulator 73, and these connections constitute actuating means—responsive to the movements of the stream-chute, and hence to variations in the force or specific gravity of the stream flowing therethrough—for transmitting the movements of the stream-chute to the regulator, and thereby swinging said regulator in one direction or the other proportionally to the movements of the stream-supporting chute H''. The operation of these parts is clearly shown in Figs. 2 and 3, through the former of which it is assumed that material—such as wheat or oats—of relatively low specific gravity is flowing, while in the latter of these views the material is assumed to be of much higher specific gravity, the difference between the two being sufficient to cause the oscillation of the stream-chute and its counterweight from the positions shown in the former figure to those illustrated in the latter, a corresponding movement of the regulator-plate being effected by the gravitative action of the oscillatory stream-supporting chute.

The mechanism for opening and closing the valve and for controlling the operation of the bucket mechanism may be of any preferred construction, but for convenience of illustration has been represented herein as substantially similar to that described in Patent No. 548,840, granted to me October 29, 1895. The bucket G is shown having a closer 75, of any suitable construction, the opening movement of which is controlled by means of a thrust-rod 596, pivoted to a rocker or stop 550, carried at the upper side of the bucket and having a detent-arm 550', adapted to be engaged by a latch 82, of any usual construction. This latch is releasable by means of a latch-tripper 88, carried by a valve-opening thrust-rod 558, pivotally connected at its upper end with the valve 70 and having its lower end in position to be engaged by a counterweighted lever 551, having its pivot at 551' on the poising side of the beam mechanism B. This beam mechanism and that shown at B' support the bucket G in the usual manner, and are themselves supported by knife-edge bearings carried by the base 3 of the apparatus. The rocker 550 constitutes a stop for preventing the opening of the valve 70 while the closer is shut, and the valve is also illustrated having a corresponding stop 412, adapted to prevent the opening of the closer while said valve is open.

Any suitable actuating means for closing the valve may be employed, that shown herein being represented at 504 as a counterweighted lever having at the working end thereof an antifriction-roll adapted to ride over the under face of a cam 500, carried by the valve 70.

The operation of the machine herein shown in connection with my improved stream-regulating mechanism will be readily understood. When the load in the bucket is being made up, the valve 70 will be wide open, as shown in Fig. 2, and on the descent of the bucket will be partially closed by the counterweighted lever 504, whereupon the remainder of the supply necessary to complete the load in the bucket will be delivered as a drip-stream, and this drip-stream will be controlled, in the manner hereinbefore described, by means of the regulator 75. After the bucket load is completed the valve 70 will be entirely closed by the action of the lever 504, and the rocker 550, being clear of the stop 412, will permit the closer to open and the bucket to discharge its contents. On the ascent of the bucket after discharging, the lever 551 will be oscillated relatively to the beam B, and on the closing of the closer will be effective to force upward the thrust-rod 558 and reopen the valve 70.

By means of a reactive stream-chute operative substantially in the manner hereinbefore stated it will be apparent that the supply of material to the bucket during the reducing period may be perfectly controlled to compensate for variations due to the commingling of different grades of material of the same general character, and hence greater precision in the making up of loads in automatic weighing-machines may be attained than is possible in machines employing valve mechanisms of the ordinary type.

Having described my invention, I claim—

1. The combination with stream-supplying means, of an automatically-operating, reactive, gravitative stream-chute movable back and forth on variations in the force of the stream of material passing therethrough.

2. The combination with stream-supplying means, of an automatically-operating, counterweighted, gravitative stream-chute movable back and forth proportionally to variations in the specific gravity of the stream of material passing therethrough.

3. The combination with stream-supplying means, of a reactive gravitative stream-chute movable back and forth on variations in the force of the stream passing therethrough, and chute-operated stream-controlling means in position and adapted for regulating the flow of the stream.

4. The combination with stream-supplying means, of a reactive gravitative stream-chute movable back and forth on variations in the force of the stream passing therethrough; a main valve controlling the efflux of the stream from said chute; and a chute-operated drip-regulator.

5. The combination with stream-supplying means, of a reactive gravitative stream-chute movable back and forth on variations in the force of the stream passing therethrough; a supply-spout at the discharge end of said chute and having a drip-opening in its front wall; a main valve controlling the flow from said spout; and a chute-operated drip-regulator controlling the drip-opening in said supply-spout.

6. The combination with an automatic weighing-machine having a bucket, of stream-supplying means; a reactive gravitative stream-chute movable back and forth on variations in the force of the stream passing therethrough; and chute-operated stream-controlling means in position and adapted for regulating the flow of the stream from the chute to the bucket.

7. The combination with stream-supplying means, of an automatically-operating reactive gravitative stream-chute oscillatory on variations in the force of the stream passing therethrough.

8. The combination with stream-supplying means, of an automatically-operating reactive gravitative duplex stream-chute oscillatory on variations in the force of the stream passing therethrough and comprising a pair of hinged sections.

9. The combination with stream-supplying means, of an automatically-operating reactive gravitative duplex stream-chute oscillatory on variations in the force of the stream passing therethrough and comprising a pair of hinged sections having coacting stops for limiting the descent of said sections.

10. The combination with stream-supplying means, of an automatically-operating reactive gravitative duplex stream-chute oscillatory on variations in the force of the stream passing therethrough and comprising a pair of tubular hinged sections.

FRANCIS H. RICHARDS.

Witnesses:
    FRED. J. DOLE,
    HENRY BISSELL.